No. 753,804. PATENTED MAR. 1, 1904.
M. H. NEIN.
HAT NAPPING MACHINE.
APPLICATION FILED JULY 22, 1903.
NO MODEL.
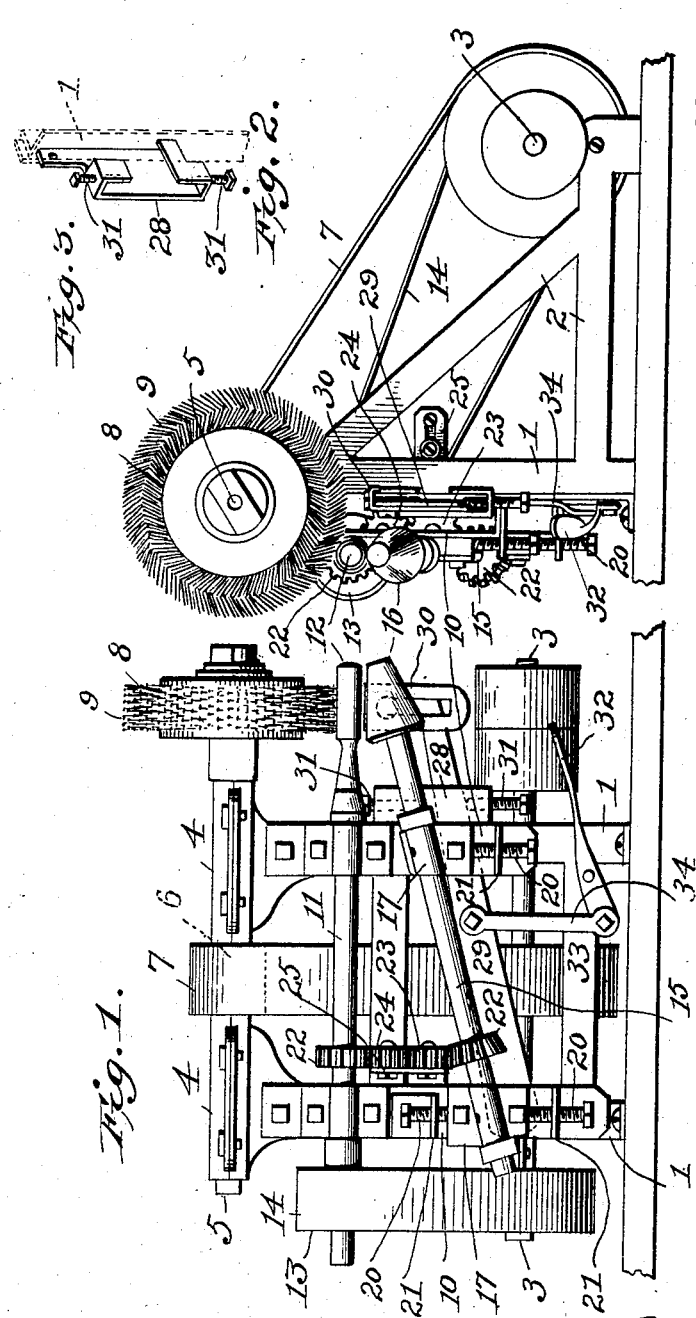
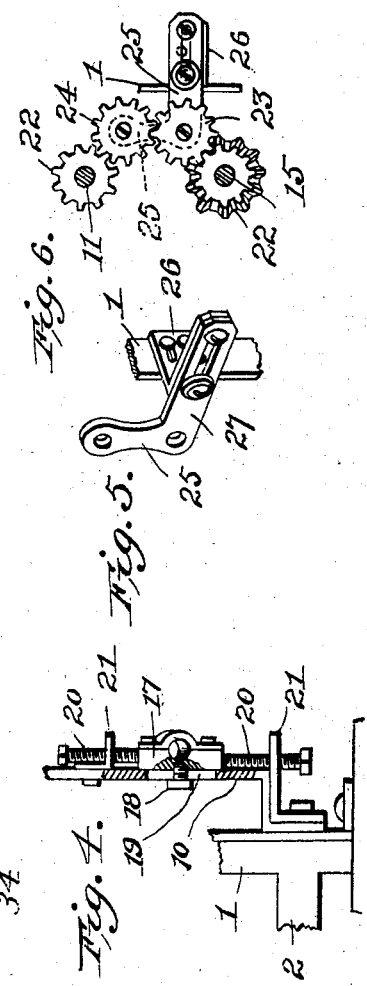
WITNESSES
Edwin L. Yewell
C. D. Davis
Milford H. Nein
INVENTOR
by R. H. Bishop
Attorney No. 753,804. Patented March 1, 1904.

UNITED STATES PATENT OFFICE.

MILFORD H. NEIN, OF MOUNT PENN, PENNSYLVANIA.

HAT-NAPPING MACHINE.

SPECIFICATION forming part of Letters Patent No. 753,804, dated March 1, 1904.

Application filed July 22, 1903. Serial No. 166,609. (No model.)

*To all whom it may concern:*

Be it known that I, MILFORD H. NEIN, a citizen of the United States of America, residing at Mount Penn, in the county of Berks and State of Pennsylvania, have invented certain new and useful Improvements in Hat-Napping Machines, of which the following is such a full, clear, and exact description as will enable others skilled in the art to which it appertains to make and use the same, reference being had to the accompanying drawings, forming a part hereof.

This invention is a machine for producing a velvety surface on hats and felted fabrics; and it consists in certain novel features of the apparatus illustrated in the accompanying drawings, as will be hereinafter first fully described and then particularly pointed out in the claims.

In the drawings just mentioned, which accompany and form a part of this specification, Figure 1 is a front elevation of a machine constructed in accordance with my invention. Fig. 2 is a side elevation of the same. Fig. 3 is a detail perspective view of the means for limiting the movement of the presser-arm or fabric-supporting plate. Fig. 4 is a detail view of the bearing for the conical roller-shaft. Fig. 5 is a detail view of the bracket which carries part of the train of gears, whereby motion is imparted to the said shaft, and Fig. 6 is a detail view of said gears.

The frame of the machine consists, essentially, of two standards 1, which are preferably formed with rearwardly-extending braces or arms 2. The main driving-shaft 3 is mounted in suitable bearings in rear of the standards and receives power and motion from any suitable motor. On the upper ends of the standards are journal boxes or bearings 4, in which is mounted a shaft 5, carrying a pulley 6 at its center, which is connected by a belt 7 with a pulley on the main driving-shaft. One end of the shaft 5 projects beyond the adjacent standard and has a napping-roller 8 secured thereto, the said roller being provided around its entire periphery with teeth 9. On the front sides of the standards are formed or secured the brackets 10, which support the shafts of the smoothing or drawing rollers, the said brackets serving to bring the said rollers into a plane in advance of the axis of the napping-roller. The shaft 11, having the upper and smaller cylindrical roller 12 on its end, is journaled in boxes or bearings secured on the brackets near the upper ends thereof and has a pulley 13 on its end opposite the roller, which pulley is connected by a belt 14 with a suitable pulley on the main driving-shaft. Below this shaft 11 is a shaft 15, which is arranged obliquely on the standards and carries the conical roller 16 at its upper end, the said conical roller coacting with the cylindrical roller 12 to press the surface of the fabric smooth. This shaft 15 is mounted in journal-boxes 17, which are held to the standards by bolts 18, projecting from their rear sides through vertical slots 19 in the brackets 10, and they are adjusted vertically by means of set-screws 20, mounted in lugs 21 on the said brackets. In Fig. 1 I have shown only one of these set-screws at the upper bearing of the shaft, while two are shown at the lower bearing. While two screws have been found to hold the shaft more firmly and steadily, one screw answers very well, and the upper bearing is so close to the bearing for the shaft 11 that the upper screw is preferably omitted at that point. The end of the screw bears against the bearing or journal box, so that if the screw be turned the box will be caused to slide up or down on the bracket, and thus adjust the shaft to the desired position. The shafts 11 15 carry pinions or gears 22, and between the said gears are two similar gears or pinions 23 24, the four forming a train of gearing by which the motion of the upper shaft derived from the pulley on its end is transmitted to the lower shaft, as will be readily understood. The gears 23 24 are carried by a bracket 25, consisting of an angle plate or iron 26, adjustably secured to the rear side of one of the standards 1, and a plate 27, adjustably secured to the said angle iron or plate. When the lower shaft 15 is shifted toward or away from the upper shaft 11, the plate 27 is shifted rearward or forward on the plate 26, so that the several gears will remain in mesh.

It will be observed on reference to Figs. 5 and 6 that the plate 27 is provided with a longitudinal slot, through which set-screws are inserted into the plate 26. In the ordinary use of the machine the gears 23 and 24 will be adjusted somewhat to the rear of the gears 22, but in mesh therewith. When thick fabric is to be treated, the shaft 15 is lowered, carrying with it the lower gear 22. The plate 27 is then adjusted forward and its front end swung slightly downward, so as to carry the gears 23 24 between the gears 22. It will be readily understood that the slot in the plate 27 permits it to be adjusted properly and that the plate 26 will be provided with a plurality of threaded openings to receive the set-screws, so that they will hold the plate 27 in any position to which it may be adjusted.

Pivoted to one of the standards 1 and extending through a keeper 28, formed or secured on the other standard, is a lever 29, which carries the fabric-supporting plate or presser-arm 30 at its upper free end. In the upper and lower ends of the keeper 28 are set-screws 31, which may be adjusted more or less into the path of the lever to limit the play of the same, and thereby regulate the force with which the said arm or plate will hold the fabric against the napping-roller. The lever is raised by a treadle 32, pivoted on a bar 33, connecting the standards and joined to the lever by a link 34, as shown.

The operation of the machine will be readily understood. The operator sits or stands at the side of the machine and passes the fabric or blocked hat between the rollers 12 and 16 and over the plate 30, which is then raised by a pressure of the foot on the treadle to carry the fabric or hat against the napping-roller. As the said roller rotates, the teeth thereon take into the body of the fabric and form a nap on the upper side of the same, the hat or fabric being guided by hand. The rollers 12 and 16 serve to press down the nap lightly, so as to impart thereto a smooth finished surface, while at the same time they aid in drawing the fabric past the napping-roller. As the napping-roller moves in the same direction as the fabric, the nap will be formed without injuring the fabric. The adjustment of the lower roller provided for in this machine permits a ready adaptation of the machine to fabrics of different thicknesses, and the set-screws which limit the play of the presser-arm enable the operator to hold the fabric against the napping-roller with a uniform pressure, so that the nap will extend to an equal depth throughout the length of the fabric. The fabric may be inserted or removed without stopping the machine, and when the machine is not in use the presser-arm drops away from the napping-roller by its own weight.

The machine is intended more particularly for napping hats after they are blocked; but it may be used for forming the nap on other fabrics.

Having thus described my invention, what I claim, and desire to secure by Letters Patent, is—

1. In a napping-machine, the combination of a napping-roller, means for rotating the same, a presser-arm below the roller, a lever supporting the said arm, and adjustable stops adjacent to the said lever to limit the movement of the same in both directions.

2. The combination with the supporting-frame, of a napping-roller mounted thereon, means for rotating the roller, a lever pivoted at one side of the frame, a keeper on the opposite side thereof through which the lever extends, a presser-arm carried by said lever and arranged below the napping-roller, and set-screws mounted in the keeper and adapted to bear against the edges of the lever.

3. The combination of a napping-roller, means for rotating the same, smoothing-rollers arranged below and in advance of the napping-roller, means for rotating the upper of said rollers, a train of gearing connecting the said rollers, means for adjusting the lower roller toward and away from the upper roller, and means for adjusting the intermediate gears of the train as the said lower roller is adjusted.

4. In a napping-machine, the combination of the frame, shafts mounted thereon and carrying smoothing-rollers at their ends, means for vertically adjusting the lower shaft, means for rotating the upper shaft, pinions on the shafts, and a bracket adjustably secured on the frame and carrying pinions meshing with the pinions on the shafts.

In testimony whereof I have signed this specification in the presence of two subscribing witnesses.

MILFORD H. NEIN.

Witnesses:
 EUGENE I. SANDT,
 GEO. D. HUMBERT.